T. M. HOUSE.
DRAIN VALVE.
APPLICATION FILED SEPT. 15, 1911.
1,032,352.
Patented July 9, 1912.
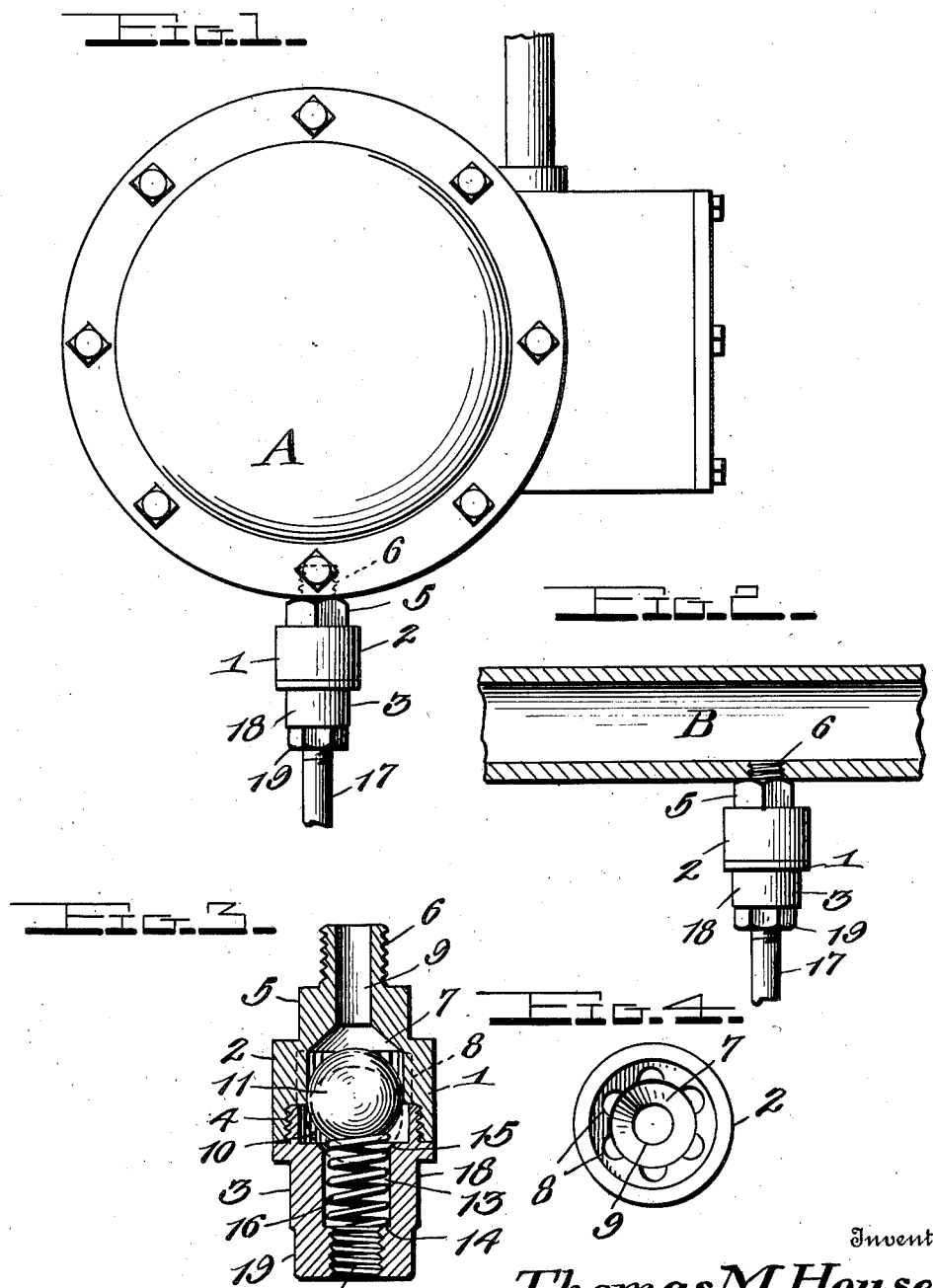
Witnesses
Chas. L. Griesbauer.
L. H. Ellis.
Inventor
Thomas M. House,
By Watson E. Coleman.
Attorney

UNITED STATES PATENT OFFICE.

THOMAS M. HOUSE, OF RICHMOND, VIRGINIA.

DRAIN-VALVE.

1,032,352.  Specification of Letters Patent.  Patented July 9, 1912.

Application filed September 15, 1911. Serial No. 649,524.

*To all whom it may concern:*

Be it known that I, THOMAS M. HOUSE, a citizen of the United States, residing at Richmond, in the county of Henrico and State of Virginia, have invented certain new and useful Improvements in Drain-Valves, of which the following is a specification, reference being had to the accompanying drawings.

This invention is an improved drain valve especially adapted for use for draining the water of condensation from steam-engine cylinders, steam pipes and the like and which may be used as a substitute for the steam traps commonly used, the object of the invention being to provide a novel form of drain valve which is extremely cheap and simple, may be readily attached to a steam-engine cylinder or to a steam pipe or the like and which operates automatically to drain the water of condensation from the cylinder or pipe when the steam pressure is diminished and is normally kept closed by the steam pressure when the steam is on, the invention consisting in the construction, combination and arrangement of devices hereinafter described and claimed.

In the accompanying drawings: Figure 1 is an elevation of an automatic drain valve constructed in accordance with my invention, showing the same attached to a steam-engine cylinder; Fig. 2 is a similar view of my improved automatic drain valve, showing the same attached to a steam pipe, the latter being indicated in section; Fig. 3 is a vertical central sectional view of my improved automatic drain valve; and Fig. 4 is an inverted plan of the upper member of the valve case thereof.

In the embodiment of my invention I provide a valve casing 1 which comprises an upper member 2 and a lower member 3 which are threaded together as at 4 and hence may be detached at will. Each member of the valve casing is here shown as cylindrical in form. The upper member has a polygonal portion 5 for engagement by a wrench and is provided at its upper end with a screw threaded stem 6 which may be engaged with a threaded opening in an engine cylinder such as indicated at A in Fig. 1 or in the steam pipe such as indicated at B in Fig. 2. The upper member 2 is formed with a chamber 7, around the wall of which are vertical channels 8, shown in full lines in Fig. 4 and indicated in dotted lines in Fig. 3. The upper portion of this chamber is of truncated, conical form, and the bore 9 of the stem 6 communicates with this chamber. The lower member 3 of the valve casing has, in its upper end, a chamber 10 which is in communication with the chamber 7, the two chambers, when the members of the valve casing are secured together, forming, in effect, a single chamber for the reception of the valve element 11 which is here shown as spherical.

The lower member 3 of the valve casing has a bore extending therethrough, the lower portion of which is screw threaded as at 12, and the upper portion of which is enlarged to form a chamber 13, at the lower end of which is a shoulder 14. The upper end of this chamber 13 is beveled and enlarged to form a valve seat 15 for the valve element 11. A coiled extensile spring 16 is disposed in the chamber 13, its lower end bears on the shoulder 14 and its upper end bears under the valve element 11 so that the said spring acts to raise the valve 11 from the seat 15 when the steam pressure in the cylinder or pipe to which the valve is attached is reduced. When the steam in the cylinder or pipe is under working pressure it closes the valve 11 against the seat 15, and against the tension of the spring 16 so as to cut off escape of steam from the cylinder or pipe through the drain valve, but when the steam pressure is reduced, as by the stopping of the engine, the spring 16 operates to open the valve element 11 from the valve seat 15 and hence the water of condensation is drained from the cylinder or the pipe by my improved automatic drain valve, the said water of condensation passing downwardly from the cylinder or steam pipe through the bore 9 into the chamber 7, around the valve 11 by the channels 8, into the lower chamber 10 and from the latter through the chamber 13 and the threaded bore 12, as will be understood. A suitable drain pipe, such as is indicated at 17 in Figs. 1 or 2, may be threaded in the bore 12 of the valve casing. The lower member 3 of the valve casing is here shown as having a reduced cylindrical portion 18 and a polygonal portion 19, the latter serving for the attachment of a wrench.

It will be understood from the foregoing description and by reference to the drawings that my improved drain valve is extremely simple in construction, may be readily manufactured at slight cost, may be readily attached to or detached from a steam cylinder, steam pipe or other like device and that it operates effectually as an automatic drain valve to discharge the water of condensation from the cylinder or pipe and hence may be used for this purpose instead of the much more expensive steam traps now in common use.

It is to be particularly noted, as best illustrated in Fig. 3, that the inner wall of the main cylindrical portion of the chamber 7 in the upper member 2 of the valve casing is of a diameter approximately equal to the diameter of the spherical valve element 11, whereby the valve element will be properly guided in its movements while at the same time the provision of the vertical channels 8 in the wall of the chamber 7 will permit the fluid to pass the valve 11 down to the valve seat 15. By thus proportioning the parts, the valve element 11, in its movements, will have a tendency to rub against the interior wall of the chamber 7 and thereby tend to keep the channels 8 clear of sediment that might pass into the upper end of the valve casing. It is also to be noted that the chamber 10 at the bottom of which the valve seat 15 is formed, is of larger diameter than the valve element 11 and the chamber 7, whereby the valve element 11 will be permitted to securely seat itself on the seat 15, by a rocking movement if necessary, the element 11 in closed position not being confined by the cylindrical portion of the chamber 7 which would possibly tend to prevent its proper seating. By making the chamber 10 slightly larger in diameter than the ball valve it is clear that the said ball valve or valve element 11 may more accurately fit upon its seat. Furthermore, the chamber 13 will at all times properly guide the spring 16. By forming the parts as hereinbefore described, it is clear that they may be cheaply manufactured, the vertical channels 8 in the chamber 7 being easily formed.

While I have herein shown and described what I now consider a preferred form of my invention, I would have it understood that modifications may be made within the scope of my invention as defined by the appended claim.

Having thus described my invention I claim:

The herein described drain valve including a casing constructed in upper and lower members, detachably secured together, the upper member being formed with a chamber, the walls of which are provided with vertical channels and the lower member being provided with a chamber communicating with the first named chamber and into which the lower ends of said channels open, the lower member being also formed with a chamber below the second named chamber communicating therewith and with a valve seat at the bottom of the second named chamber, a spring in the third mentioned chamber, and a spherical valve element mounted in the first two chambers and adapted to rest on the valve seat, the valve element being of a diameter substantially equal to the diameter of the first named chamber and of less diameter than the diameter of the second named chamber.

In testimony whereof I hereunto affix my signature in the presence of two witnesses.

THOMAS M. HOUSE.

Witnesses:
J. W. GARNER,
GEO. S. LIVINGSTON.